United States Patent
Guthrie et al.

(10) Patent No.: US 8,971,074 B2
(45) Date of Patent: Mar. 3, 2015

(54) BIAS SUPPLY, A POWER SUPPLY AND A METHOD OF USING BIAS SUPPLY VOLTAGE LEVELS TO SIGNAL INFORMATION ACROSS AN ISOLATION BARRIER

(75) Inventors: Stephen C. Guthrie, Allen, TX (US); Subarna Pal, Wylie, TX (US)

(73) Assignee: General Electric Company, Schenectady, NY (US)

(*) Notice: Subject to any disclaimer, the term of this patent is extended or adjusted under 35 U.S.C. 154(b) by 256 days.

(21) Appl. No.: 13/343,216

(22) Filed: Jan. 4, 2012

(65) Prior Publication Data

US 2012/0169316 A1  Jul. 5, 2012

Related U.S. Application Data

(60) Provisional application No. 61/429,804, filed on Jan. 5, 2011.

(51) Int. Cl.
*H02M 3/335* (2006.01)
*H02M 1/00* (2006.01)

(52) U.S. Cl.
CPC .. *H02M 3/33523* (2013.01); *H02M 2001/0006* (2013.01)
USPC .............................. 363/78; 363/16; 363/21.01

(58) Field of Classification Search
CPC .................................................. H02M 2001/006
USPC ........................ 363/78, 21.01, 16; 340/310.17
See application file for complete search history.

(56) References Cited

U.S. PATENT DOCUMENTS

| | | | | |
|---|---|---|---|---|
| 5,663,672 A | * | 9/1997 | Nuechterlein | ................. 327/374 |
| 5,798,913 A | * | 8/1998 | Tiesinga et al. | ............. 363/21.13 |
| 5,900,683 A | * | 5/1999 | Rinehart et al. | .............. 307/129 |
| 5,949,659 A | | 9/1999 | Lesche | |
| 6,724,642 B2 | * | 4/2004 | Brkovic | ..................... 363/21.08 |

* cited by examiner

*Primary Examiner* — Harry Behm
(74) *Attorney, Agent, or Firm* — GE Global Patent Operation

(57) ABSTRACT

A bias supply, a method of communicating data across an isolation barrier and a power supply are provided herein. In one embodiment, the bias supply includes: (1) a bias supply transformer having a primary winding inductively coupled to a secondary winding across an isolation barrier, (2) a controller configured to direct operation of the bias supply and (3) bias voltage manipulating circuitry, coupled to an input of the controller, configured to receive primary data and based thereon alter a secondary bias output voltage of the secondary winding between defined voltage levels by varying a voltage provided to the controller, the controller and the bias voltage manipulating circuitry located on the primary side.

19 Claims, 6 Drawing Sheets

BIAS SUPPLY, A POWER SUPPLY AND A METHOD OF USING BIAS SUPPLY VOLTAGE LEVELS TO SIGNAL INFORMATION ACROSS AN ISOLATION BARRIER

CROSS-REFERENCE TO RELATED APPLICATION

This application claims the benefit of U.S. Provisional Application Ser. No. 61/429,804, filed by Lineage Power Corporation on Jan. 5, 2011, entitled "USING BIAS SUPPLY VOLTAGE LEVEL TO SIGNAL INFORMATION ACROSS AN ISOLATION BARRIER," by Stephen C. Guthrie, et al., commonly assigned with this application and incorporated herein by reference.

TECHNICAL FIELD

This application is directed, in general, to power modules having input to output isolation and, more specifically, to communicating information across an isolation barrier.

BACKGROUND

Isolated board-mounted power (BMP) modules typically have an input on the primary side which is designed to enable or disable the module output (an "ON/OFF" input) based on a signal issued by the using system. If the controller of the power module is on the primary side (input side), the interface to either a dedicated hardware circuit like a comparator, or the input to a processor which controls the output of the power module is usually simple and straightforward.

Power module designs incorporating a processor or controller, such as a microprocessor on the secondary side present the challenge of bringing the primary side information, such as input ON/OFF, input undervoltage/overvoltage shutdown, startup input faults, switching frequency, etc., across the isolation barrier. An isolation barrier is employed to provide galvanic isolation which prevents the flow of dc currents between functional sections of an electrical system. For an isolated power module the isolated functional sections may be the primary or input section and the secondary or output section. In most cases, primary side information is transferred across an isolation barrier by dedicated single-purpose devices such as opto-couplers or magnetic means using a signal transformer.

SUMMARY

One aspect provided herein is a bias supply. In one embodiment, the bias supply includes: (1) a bias supply transformer having a primary winding inductively coupled to a secondary winding across an isolation barrier, (2) a controller configured to direct operation of the bias supply and (3) bias voltage manipulating circuitry, coupled to an input of the controller, configured to receive primary data and based thereon alter a secondary bias output voltage of the secondary winding between defined voltage levels by varying a voltage provided to the controller, the controller and the bias voltage manipulating circuitry located on the primary side.

In another aspect a method of communicating data across an isolation barrier is disclosed. In one embodiment, the method includes: (1) receiving a signal to transmit across an isolation barrier located between a primary side and a secondary side of a bias transformer, (2) varying a voltage provided to a controller on the primary side in response to receiving the signal and (3) altering a secondary bias voltage on the secondary side between defined voltage levels in response to the varying, wherein the defined voltage levels are selected to indicate the signal.

In yet another aspect, the disclosure provides a power supply. In one embodiment, the power supply includes: (1) a power transformer, (2) a bias supply including: (2A) a bias supply transformer having a primary winding inductively coupled to a secondary winding via an isolation barrier, (2B) a bias controller configured to direct operation of the bias supply transformer and (2C) bias voltage manipulating circuitry configured to receive primary data and based thereon alter a secondary bias output voltage of the secondary winding between defined voltage levels by varying a voltage provided to the bias controller, the bias controller and the bias voltage manipulating circuitry located on a primary side of the bias supply transformer, and (3) a power supply controller on a secondary side of the power transformer and configured to receive the secondary bias voltage and differentiate the defined voltage levels to detect receipt of the primary data on the secondary side.

In still yet another embodiment, the disclosure provides an embodiment of another power supply. In this embodiment, the power supply includes: (1) a power transformer, (2) a bias supply including: (2A) a bias supply transformer having a primary winding inductively coupled to a secondary winding via an isolation barrier, (2B) a bias controller configured to direct operation of the bias supply transformer and (2C) bias voltage manipulating circuitry configured to receive primary data and based thereon alter a secondary bias output voltage of the secondary winding between defined voltage levels by varying a voltage provided to the bias controller, the bias controller and the bias voltage manipulating circuitry located on a primary side of the bias supply transformer, and (3) a power supply controller on a secondary side of the power transformer and configured to receive the secondary bias voltage and differentiate the defined voltage levels to detect receipt of the primary data on the secondary side based on transitions between the defined voltage levels.

BRIEF DESCRIPTION

Reference is now made to the following descriptions taken in conjunction with the accompanying drawings, in which.

DETAILED DESCRIPTION

Figure 1:
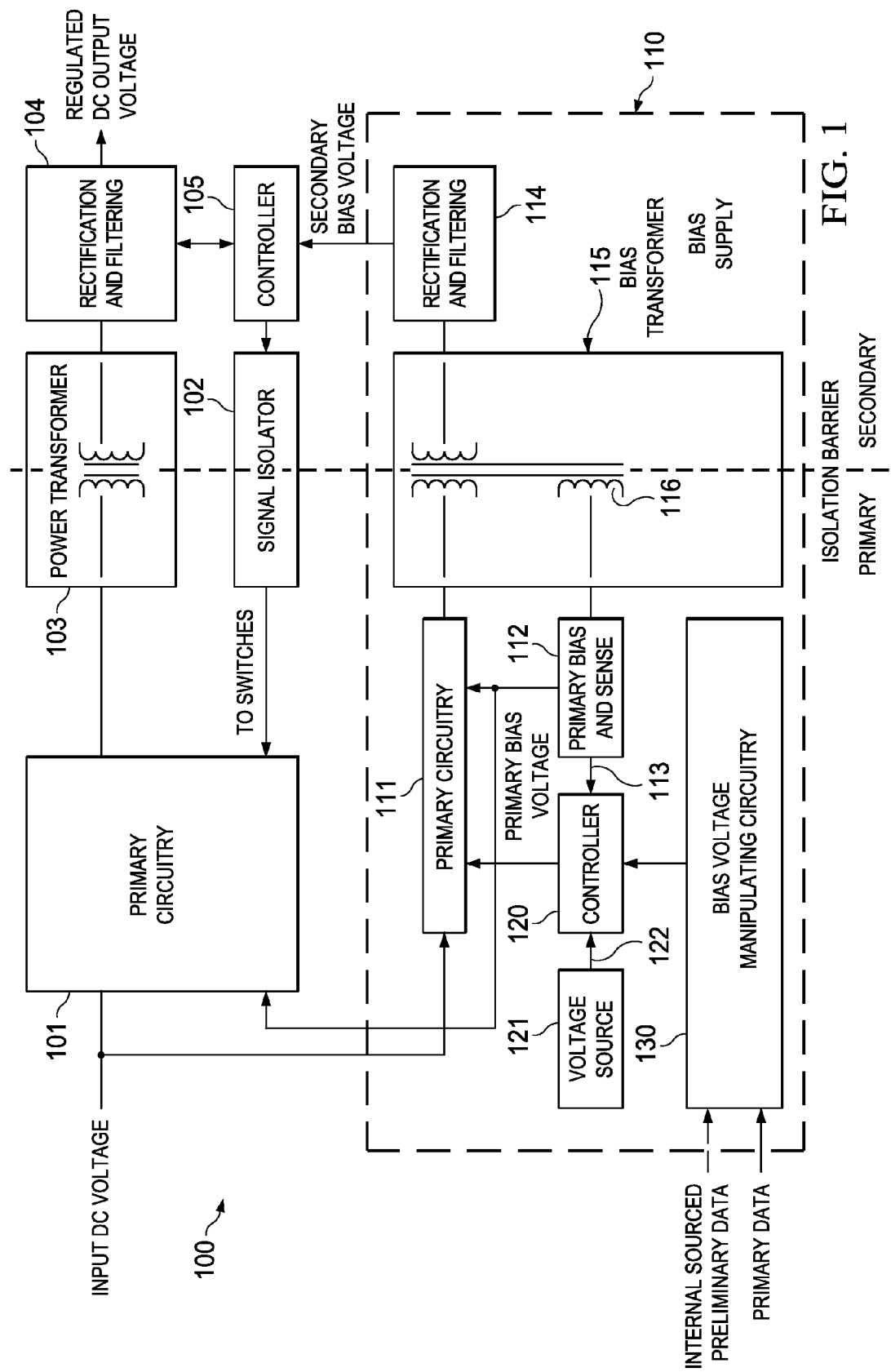
FIG. 1 illustrates a block diagram of an embodiment of a power supply utilizing a bias supply constructed according to the principles of the disclosure.

As noted above, transmission of information across an isolation barrier is typically done with a single-purpose device using optical or magnetic means. These additional devices, however, increase the complexity and cost of power modules. Additionally, the additional devices can cause thermal de-rating penalties for the power modules since some of these devices have maximum operating temperatures that are lower than that of the other components.

Disclosed herein is a scheme wherein a bias supply, such as a bias supply of an isolated power supply or power module, is used to signal a primary state or condition to the secondary side of the power supply or power module by varying the secondary bias voltage level. The transformer of the bias supply provides the necessary galvanic isolation and eliminates the need for a special interface device. As disclosed in embodiments herein, a controller located on the primary side of a bias supply is used to vary a secondary bias voltage thereby providing a signal across an isolation barrier. In some embodiments, the bias supply is a bias power supply of an isolated power module. In other embodiments, the bias supply is used in other applications needing bias power across an isolation barrier.

In one embodiment, a bias supply is a low power, dc-dc converter that provides power for operating the control circuitry of a power supply or power module. The bias supply typically includes a transformer with a primary winding and a least one isolated secondary winding, a switch, a controller, and associated filtering and rectifying components normally found in a dc-dc converter. In some embodiments, a bias supply has a primary side controller to provide regulation and may use a winding on the bias supply transformer to indirectly sense the secondary bias voltage. Furthermore, secondary side control circuitry in the main power supply or power module that is powered by the secondary bias voltage can usually tolerate the wider voltage variations, such as for example +/−20%, that results with indirect sensing. Secondary side control circuitry that requires a more accurate supply voltage than an indirect sensing scheme can provide will typically have a subsequent regulation stage, for example, a low power linear regulator.

The absolute value of the secondary bias voltage is not critical to power delivery or the signaling of information across the isolation barrier. Instead, the difference in voltage between multiple levels is employed to allow a signal to be detected and transmitted across an isolation barrier.

In some embodiments disclosed herein, multiple voltage level combinations can be employed to transmit various types of primary information across an isolation barrier. For example a positive 2 volt level change may indicate one signal and a minus 2 volt level change would indicate another. For example, a higher resolution Analog to Digital Converter (ADC) can be employed to transmit various types of primary information. With a high resolution ADC, very small changes to the voltage levels can be used to transmit information. All of the multiple voltage levels can be calibrated during manufacturing or at a customer's application to produce consistent results. One skilled in the art will understand that calibration can be implemented through an existing communication protocol or by directly programming the calibration factors into the program memory. In one embodiment, an industry standard protocol, such as I2C, is used for calibration. I2C is a two-wire serial bus that can be used to provide communication between integrated circuits. Other protocols, such as other low-bandwidth, short distance protocols for on board communications, can be used for calibrating.

In another embodiment disclosed herein, the primary side data (or information) may be a single pulse or series of timed pulses such that the secondary bias voltage transitions between the defined voltages at least once in a defined interval. The controller sensing the secondary bias voltage would then recognize that during a defined interval one transition from a defined voltage to another is one signal, while two transitions from a defined voltage to another defined voltage and then returning to the original defined voltage indicates another signal. In like manner, n transitions define n signals. After the defined interval the secondary bias returns to defined voltage that existed prior to the timed interval.

The disclosure recognizes that the primary bias voltage used to power primary control circuits in the power supply or power module changes in concert with changes in the secondary bias voltage and that these voltages are used in the gate drive circuitry of the FETs used for primary side switches and secondary side synchronous rectifiers. The disclosure also recognizes applying a variable bias voltage controlled by primary conditions to the gate drive circuitry for switch drivers on both the primary and secondary side of power supplies or power modules. As such, optimum gate voltages for a vendor's power switch can be produced in order to improve efficiency of the power module. In one embodiment, the control of this variable bias voltage is based on a parameter or combination of parameters such as primary side temperature, switching frequency, input current or input voltage.

FIG. 1 illustrates a block diagram of an embodiment of a power supply 100 constructed according to the principles of the disclosure. The power supply 100 includes primary circuitry 101, a signal isolator 102, a power transformer 103, rectification and filtering 104, a power supply controller 105 and a bias supply 110. The bias supply 110 provides primary bias voltage to the primary circuitry 101 and secondary bias voltage to the controller 105 and other output circuitry as required. The bias supply 110 includes bias supply controller 120, a voltage source 121, and bias voltage manipulating circuitry 130. Additionally, the bias supply 110 includes primary circuitry 111, primary bias and sense circuitry 112, rectification and filtering 114, and bias transformer 115. The primary circuitry 111 may include filtering components, the switching device and its associated drive circuitry. One skilled in the art will understand the operation and configuration of the primary circuitry 101, 111, the signal isolator 102, the primary bias and sense circuitry 112 and the rectification and filtering 104, 114. One skilled in the art will also understand that the power supply 100 and the bias supply 110 may include additional components and circuitry that are typically included in a power supply but are not included herein.

The power supply 100 is configured to generate DC power. In one embodiment, the power supply 100 may be a DC to DC converter that receives a DC voltage and generates therefrom at least one other DC voltage. In another embodiment, the power supply 100 may be an AC to DC power supply that receives an AC voltage and generates therefrom at least one DC voltage. In this embodiment, an additional AC to DC rectifier may be coupled in front of the input to the power supply 100.

The bias supply 110 is a DC to DC converter that is configured to convert a source of DC power, an input DC voltage, to another DC power, another DC voltage level. The bias supply 110 receives the input DC voltage, and generates therefrom at least one DC output. In FIG. 1 the bias supply 110 generates two separate outputs shown as Primary Bias Voltage and Secondary Bias Voltage. These voltages may be equal or different. In one embodiment, the bias supply 110 may be a board mounted power (BMP) module. In this embodiment, the bias voltage manipulating circuitry 130 may be external to the bias supply 110.

The bias supply 110 includes a bias transformer 115 and bias voltage manipulating circuitry 130. The transformer 115 may be a conventional transformer that is used in power modules or power supplies. The bias transformer 115 includes a primary side, an isolation barrier and a secondary side. On the primary side, the bias transformer 115 includes a primary winding that receives the input DC voltage. Additionally, the bias transformer 115 includes a bias winding 116 on the primary side that is used to generate a sense voltage 113 and a primary bias voltage.

The bias voltage manipulating circuitry 130 is configured to alter the secondary bias voltage between defined voltage levels by varying a controller voltage provided to the controller 120 based on primary data. The controller voltage may be a sensed voltage 113 provided to bias controller 120 or a reference voltage 122 provided to the controller 120 by the voltage source 121. The primary data is a signal or information from the primary side of the bias transformer 115 that is to be transmitted through the isolation barrier of the bias transformer 115 to the secondary side. In the illustrated embodiment, the primary data is received as an input from a source external to the bias supply 110. An input pin of the power supply 100 may be used to receive the primary data. The primary data may also be received as an input from a source within the power supply 100 as denoted by the dashed line in FIG. 1. The primary data may be a single signal or, in some embodiments, the primary data may be multiple signals. As such, the bias voltage manipulating circuitry 130 may include a multiplexer for receiving primary data with multiple types of signals. In one embodiment, the bias voltage manipulating circuitry 130 interfaces with the controller 120 to vary the controller voltage provided to the bias controller 120 based on the primary data. In one embodiment the bias controller 120 is a digital controller. In another embodiment, the bias controller 120 is an analog controller such as a pulse width modulation (PWM) controller.

Figure 5:
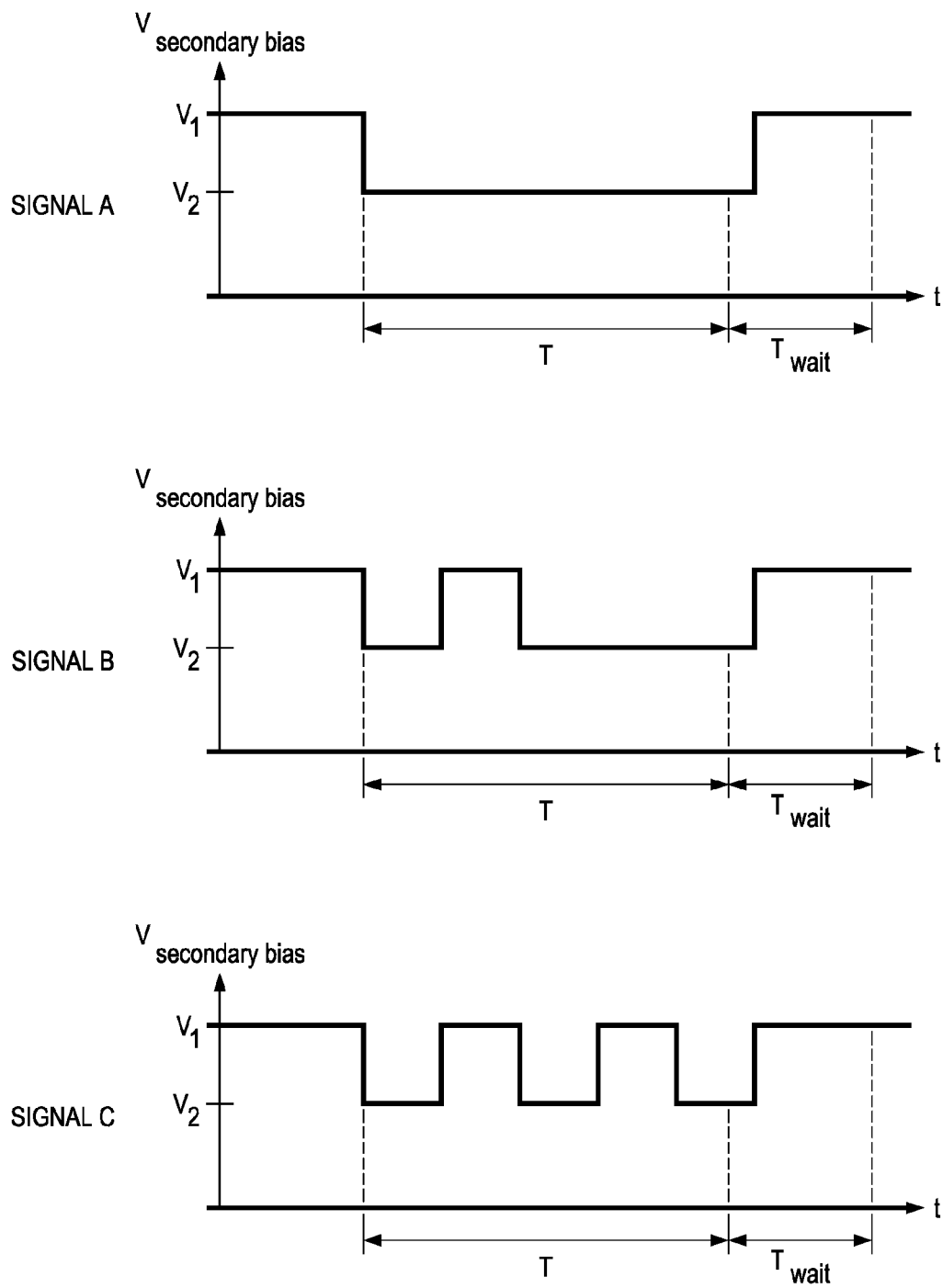
FIG. 5 illustrates timing diagrams representing an embodiment of transmitting a plurality of primary side signals across an isolation barrier based on transitions between two defined voltages, V1 and V2.

The power supply controller 105 contains a digital controller such as a microcontroller. The power supply controller 105 is configured to sense and differentiate the voltage levels of the secondary bias voltage and determine therefrom receipt of the primary data. In one embodiment, the power supply controller 105 differentiates transitions between the voltage levels of the secondary bias voltage. FIG. 5 illustrates an example of three different signals that may be communicated by differentiating the transitions In addition to differentiating the voltage levels, the power supply controller 105 may be configured to direct and control the operation of the power supply 100 including sending timing signals to the switches in the primary circuitry 101 via the signal isolator 102. The power supply controller 105 is configured to provide a regulated output voltage of power supply 100. In some embodiments, an unregulated or a semi-regulated output voltage is provided. As such, the disclosure also applies to unregulated and semi-regulated converters as well, wherein, for example, there is a controller on the secondary side for controlling the switching of the synchronous FETS. For example, the power supply controller 105 includes the necessary circuitry, sequence of operating instructions, or combination thereof to provide a regulated output voltage. In addition the controller 105 and the rectification and filter 104 employ the secondary bias voltage from the bias supply 110 as a supply voltage (e.g., Vcc).

Figure 2A:
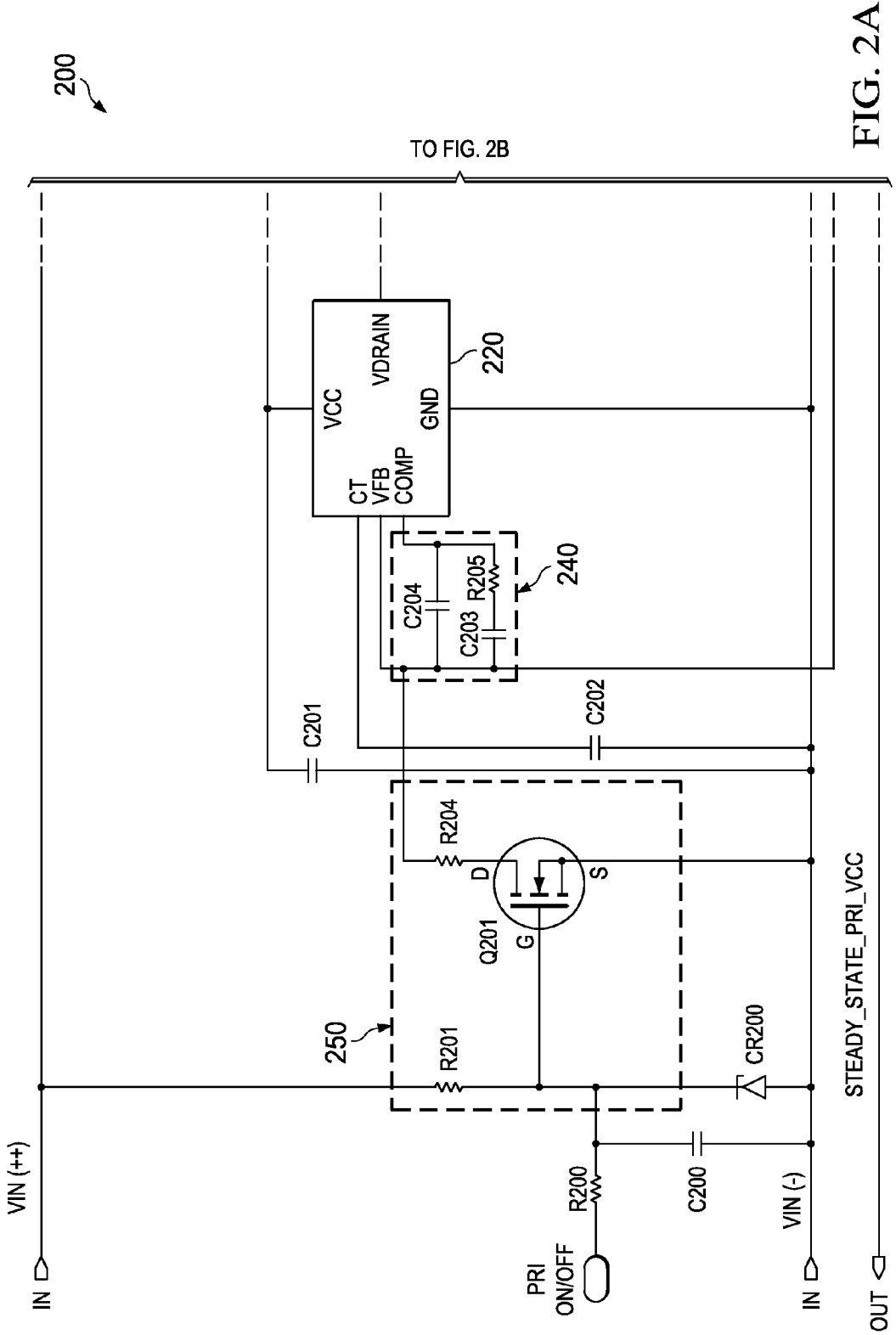
FIG. 2 illustrates a schematic of an embodiment of a bias supply constructed according to the principles of the disclosure.
Figure 2B:
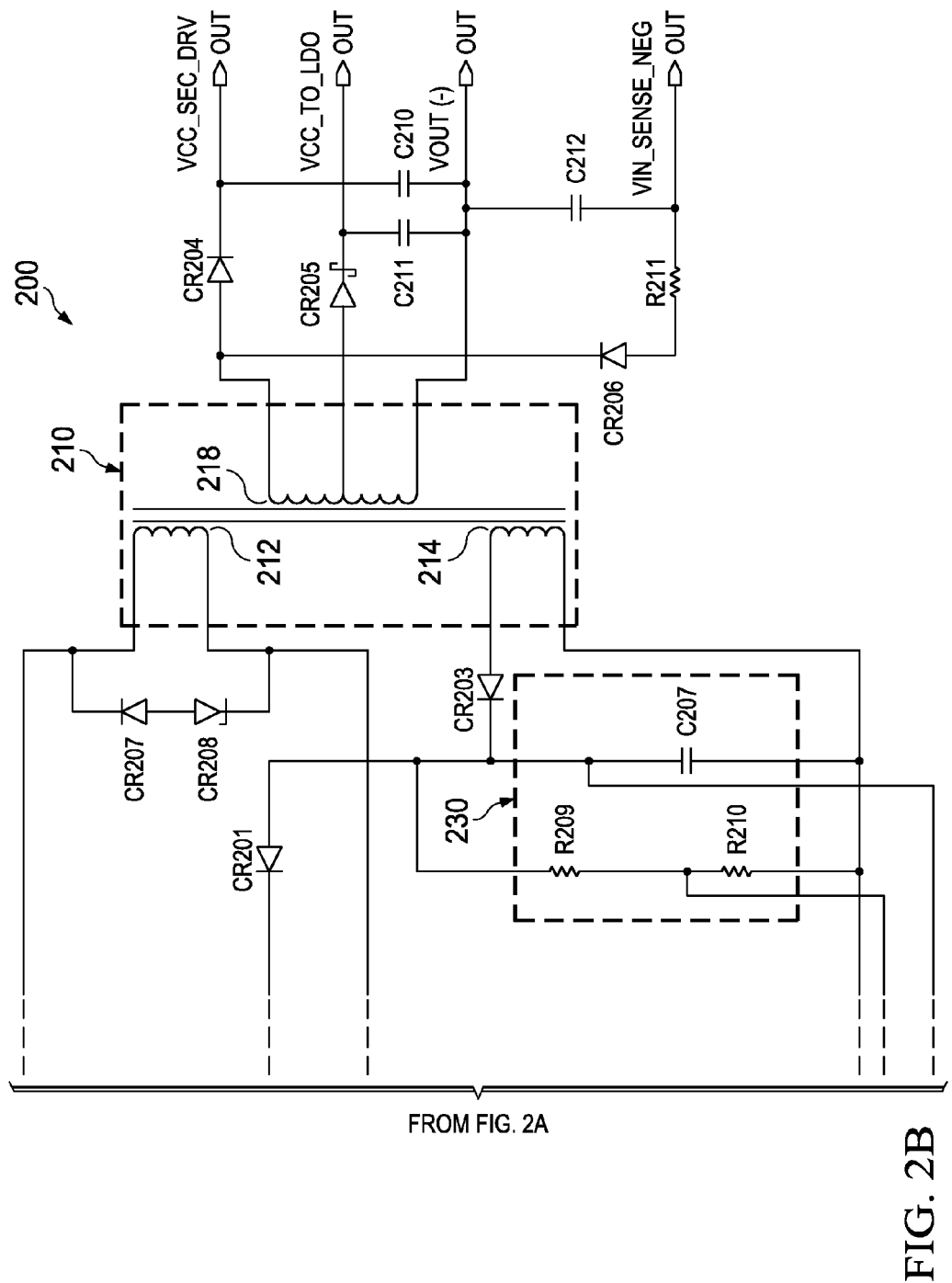

FIG. 2, split into FIG. 2A and FIG. 2B, illustrates a schematic of an embodiment of a bias supply 200 constructed according to the principles of the disclosure. The bias supply 200 receives an input DC voltage (i.e., $V_{IN}(++)$ and $V_{IN}(-)$ in FIG. 2A) and includes a transformer 210, a bias controller 220, bias voltage circuitry 230, bias voltage compensation circuitry 240, and manipulating circuitry 250. The bias supply 200 may be a power module or at least a portion of a power module, such as a board mounted power module.

The transformer 210 includes a primary winding 212 and a bias winding 214 on the primary side of an isolation barrier. One skilled in the art will understand the construction of transformers with isolated primary and secondary windings and an isolation barrier. Additionally, the transformer 210 includes a secondary bias winding 218 on the secondary side of the transformer 210. In this embodiment the secondary bias winding 218 is tapped so that two secondary bias voltages are provided, VCC_SEC_DRV and VCC_TO_LDO.

In this embodiment the bias controller 220 contains the switching device connected between Vdrain and Gnd. Other controllers may utilize an external switching device. The bias controller 220 also contains a pulse-width modulator, oscillator, error amplifier, reference and other circuitry commonly found in a controller for dc-dc converters. The bias controller 220 is configured to monitor via the feedback input, $V_{FB}$, the sensed bias supply voltage developed by the bias winding 214 and the resistor divider R209 and R210 in bias voltage circuitry 230. The bias controller 220 may adjust the pulse-width of the switching device to maintain the bias voltage at a predetermined level. The bias voltage compensation circuitry 240 is designed to insure that the system is stable. In this embodiment, the bias controller 220 is configured to regulate at 2.5 volts the sensed bias supply voltage appearing at the junction of R209 and R210. The bias controller 220, the bias voltage circuitry 230 and the bias voltage compensation circuitry 240 are conventional components that are typically used with an isolated power module having a primary side bias winding used for sensing the output voltage. One skilled in the art will understand that the bias controller 220 may include additional terminals that are not illustrated or discussed. Those skilled in the art will also understand that there are other ways to sense the output voltage without crossing the isolation boundary or using a separate sense winding. One method for example is to measure the primary winding voltage when the output rectifier is conducting. The sensed voltage would be representative of the output voltage times the primary-to-secondary winding turns ratio. This voltage could be rectified, filtered and divided down to provide an acceptable sensed bias supply voltage.

The manipulating circuitry 250 is also coupled to the feedback input, $V_{FB}$, of the bias controller 220. The manipulating circuitry 250 is configured to receive primary data and vary a controller voltage provided to the bias controller based thereon. As illustrated in FIG. 2, the primary data is received via an input pin of the bias supply 200 by the manipulating circuitry 250. The bias supply 200 includes additional input pins to receive the DC input voltage. Additionally, the bias supply 200 provides bias voltage for primary control circuitry (not shown) via the pin designated STEADY_STATE_PRI_VCC. On the secondary side of the transformer 210, two output bias voltages are provided, VCC_SEC_DRV and the VCC_TO_LDO. These voltages may be used to power the secondary gate drive circuitry and secondary control circuitry, respectively of the main power stage. The bias supply 200 may include additional pins that are not illustrated.

The bias supply 200 is configured to transmit primary data from the primary side across the isolation barrier to the secondary side. By changing the sensed feedback voltage of the bias voltage circuitry 230 which is located on the primary side, the secondary bias voltages can be changed between defined voltage levels which in turn can be differentiated by, for example, a secondary microprocessor/controller.

For example, a secondary bias supply can be used to deliver primary input ON/OFF function and power to secondary components. The manipulating circuitry 250 receives a primary on/off signal at the pin designated PRI ON/OFF. In FIG. 2, the manipulating circuitry 250 employs a negative logic system. This means that a logic low PRI ON/OFF signal holds the power supply 100 in the "on" or powered state. Q201 of the manipulating circuitry 250 is open or off since its gate voltage is held low by the logic low PRI ON/OFF signal. The bias controller 220 is then regulating the bias supply voltage based on the sensed voltage at the midpoint of the voltage divider of the 230 (i.e., between R210 and R209). When the PRI ON/OFF signal is in the logic high state the power supply 100 is in the "off" state or shutdown. The gate voltage of Q201 is now at the voltage generated by zener diode CR200 and Q201 is turned-on. Resistor R204 of the manipulating circuitry 250 is then placed in parallel with R210 of the bias voltage circuitry 230. The sensed voltage is now lower than reference voltage of 2.5 volts. In response, the bias controller 220 adjusts the duty cycle of the switching transistor increasing the voltage of the bias winding 214 until once again the sensed voltage at the junction of R209 and R210 is 2.5 volts. Accordingly the secondary bias voltage increases in response thereof. The controller 105 in FIG. 1 would sense the voltage difference in the secondary bias voltage, for example VCC_S-EC_DRV, as a result of Q201 being in either the open (off) or the on state and issue signals to control the power supply 100 to be in the "on" or "off" state accordingly. One skilled in the art will understand that in a positive logic system, the manipulating circuitry 250 would differ in order to change the controller voltage upon receipt of the primary data and that manipulator circuitry with a positive logic system can be designed using switching devices and circuitry other than what is shown in FIG. 2 to achieve the same results.

Figure 3:
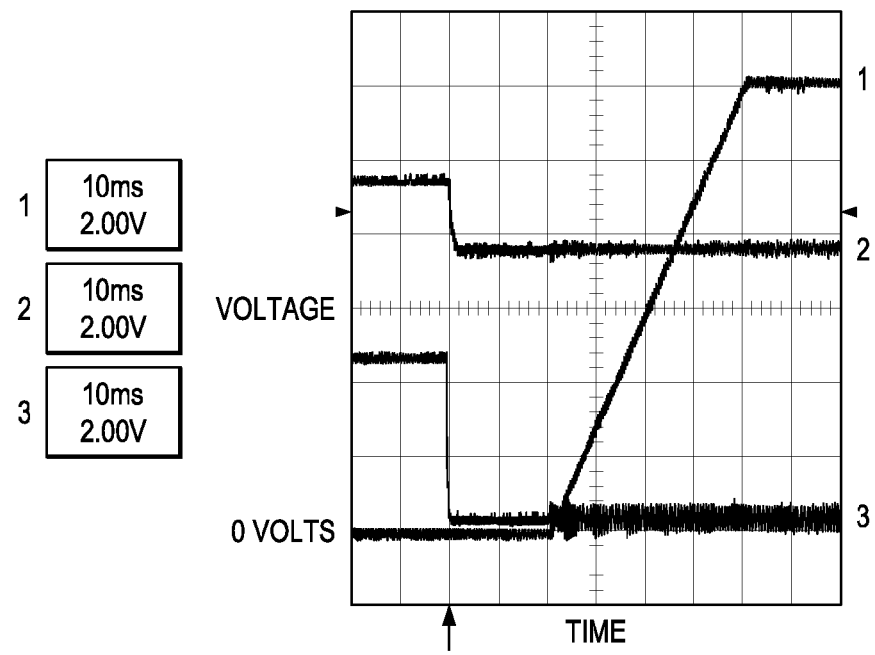
FIG. 3 illustrates a graph showing the output voltage of the power supply 100 of FIG. 1 and a change in a secondary bias voltage (an on state) with respect to primary data.
Figure 4:
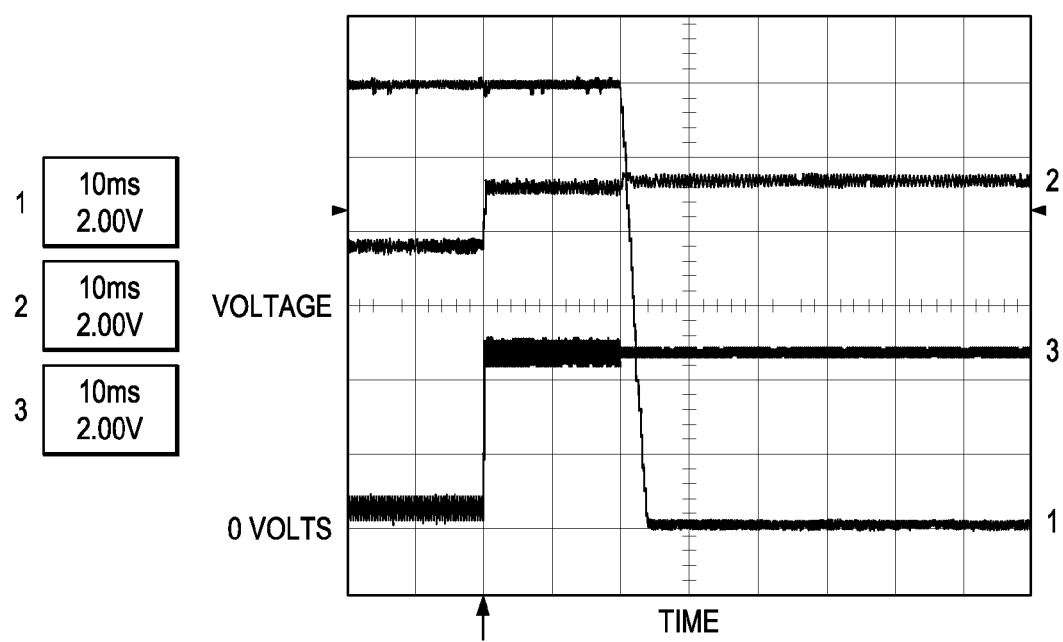
FIG. 4 illustrates a graph showing the output voltage of the power supply 100 of FIG. 1 and a change in a secondary bias voltage (an off state) with respect to primary data.

FIG. 1 shows a block diagram of an embodiment of the power supply 100 with bias supply 110. FIG. 3 and FIG. 4 show a change in secondary bias voltage when a primary ON/OFF signal is received. Also shown is the change in the output voltage of the power supply 100 in response to the primary ON/OFF signal. For FIG. 3 and FIG. 4, the bias supply 110 may be configured as the bias supply 200 in FIG. 2.

FIG. 3 and FIG. 4 illustrate a view of an oscillograph showing the output voltage of the power supply 100 of FIG. 1 responding to a change in a secondary bias voltage with respect to a primary ON/OFF signal. In both FIG. 3 and FIG. 4, the vertical axis is voltage in volts and the horizontal axis is time in milliseconds. The associated voltage and time divisions for each particular illustrated wave are provided on the left side of the graphs. The zero volt reference point is also indicated. In both FIG. 3 and FIG. 4, the first wave (1) represents the output voltage of the power supply 100, the second wave (2) represents the secondary bias voltage that shows transition between the on and off state with respect to the primary on/off signal, and the third wave (3) represents the primary on/off input. In FIG. 3, the graph shows the transition of the primary on/off signal from a logic high to low state. As the transition occurs, the secondary bias voltage decrements by about two volts. Thereafter, in response, the power supply 100 starts up and its output voltage ramps from zero to a steady state value of 12 volts. In FIG. 4, the graph shows the transition of the primary on/off signal from a logic low state to high state. As the transition occurs, the secondary bias voltage again changes and increases by about two volts. Thereafter, the power supply 100 is shutdown and the power supply 100 output voltage ramps from 12 volts to zero.

FIG. 5 illustrates timing diagrams representing an embodiment of transmitting a plurality of primary side signals across an isolation barrier based on transitions between two defined voltages, V1 and V2. Three signals are illustrated in FIG. 5, Signal A, Signal B and Signal C. In each timing diagram, the horizontal axis is time and the vertical axis is a secondary bias voltage, such as the secondary bias voltage that is provided controller 105 in FIG. 1.

In this embodiment, a controller, such as the controller 105, senses the secondary bias voltage and counts the number of times the voltage is, for example, at level V2. Signal A is recognized as having a count of one. Signal B would be recognized with a count of two and Signal C would yield a count of three. Additional signals can be transmitted with additional counts. The time interval T is initiated at the first transition from V1 to V2. As noted previously, in some embodiments more than two voltage levels can be used to communicate information. Accordingly, within the time interval T more than the illustrated two voltage levels can be used in a pulse stream to encode information. Thus, in some embodiments within the time interval T the voltage levels V1 and V2 can be of different amplitudes. In this embodiment, the number of signals is limited by the capability of the bias supply to effect the transitions readable by the controller during the time interval T. After recording the signal count, the controller decodes the signal and takes appropriate action. For example, Signal A may be a turn-on signal, Signal B a turn-off signal, and Signal C an over-temperature signal. The length of the time interval T may be limited by the time delay that system requirements may impose upon the initiation of a signal and the subsequent response to it. The controller may also be programmed to only count transitions that remain at the defined voltage level, V2, for a minimum duration to increase noise immunity and reduce false responses to the signals being transmitted. The secondary bias voltage may return to its original value, V1, after the defined time interval T. Of course this embodiment may also be realized by counting the number of times the secondary bias voltage is at the V1 level. After the defined interval T, the controller may initiate a wait period, Twait, where it will not sense additional signals or transitions and allow the secondary bias voltage to return to its original value, here shown as V1. After the Twait interval the controller would reset and be ready to sense additional signals.

Figure 6:
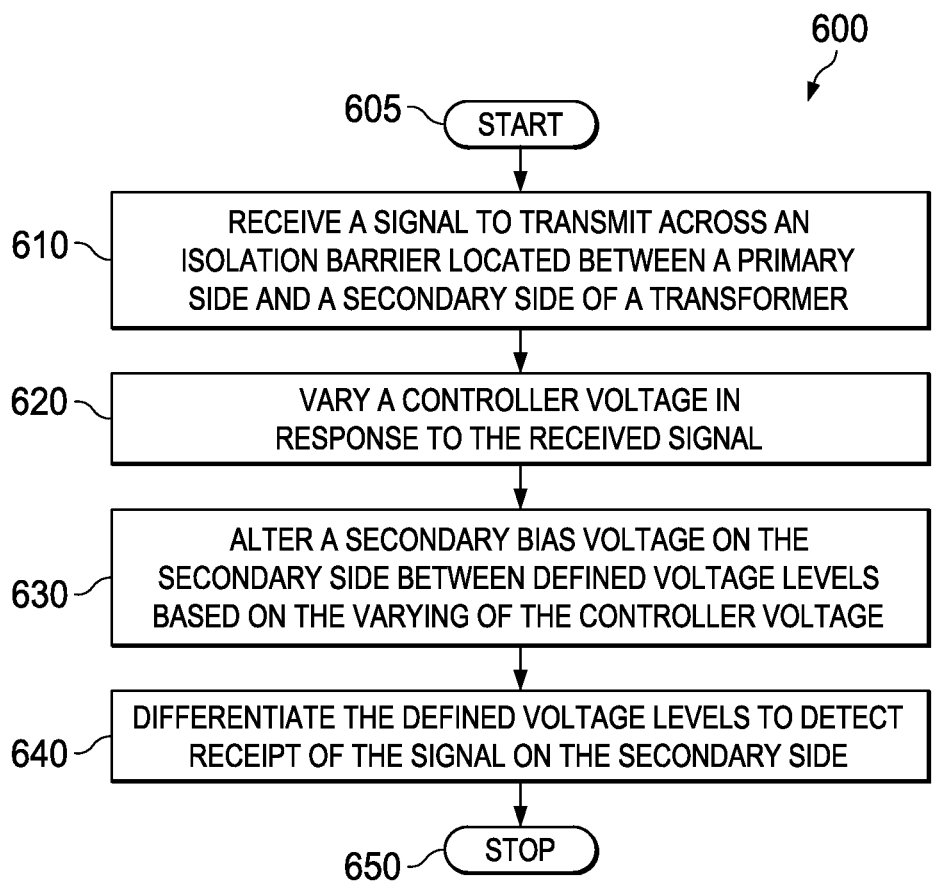
FIG. 6 illustrates a flow diagram of an embodiment of a method of communicating data across an isolation barrier carried out according to the principles of the disclosure.

FIG. 6 illustrates a flow diagram of an embodiment of a method of communicating data across an isolation barrier carried out according to the principles of the disclosure. The method 600 begins in a step 605.

In a step 610, a signal to transmit across an isolation barrier located between a primary side and a secondary side of a bias transformer is received. The signal is primary data. In one embodiment, the signal may be the transition from an on-state to an off-state or from an off-state to an on-state. The primary data may be a primary side condition or multiple primary side conditions that are received by a bias voltage manipulator to be communicated across an isolation barrier of the transformer. In some embodiments, the primary data is a primary side referenced temperature measurement, a switching frequency of a primary side switch, a primary side referenced current or voltage.

A controller voltage supplied to a bias controller is varied in response to receiving the signal in a step 620. In one embodiment, the controller voltage is a sensed voltage derived from the bias winding on the primary side of the bias transformer. In another embodiment, the controller voltage is a reference voltage for the bias controller. In one embodiment, varying of the controller voltage may have multiple steps to allow multiple signals to be transmitted across the isolation barrier. For example, a one volt variation indicates one signal and a two volt step indicates another signal. In another embodiment, transitions between defined voltage levels during a defined interval are used to transmit multiple signals. The bias controller is located on the primary side of the bias transformer.

In a step 630, a secondary bias voltage on the secondary side is altered between defined voltage levels based on varying the controller voltage, wherein the defined voltage levels are selected to indicate the signal. The defined voltage levels are differentiated in a step 640 to detect receipt of the signal on the secondary side. In one embodiment, transitions between the defined voltage levels are differentiated. A secondary processor may differentiate the defined voltage levels. The method 600 ends in step 650.

Those skilled in the art to which this application relates will appreciate that other and further additions, deletions, substitutions and modifications may be made to the described embodiments.

What is claimed is:

1. A bias supply having a primary side and a secondary side, comprising:
   a bias supply transformer having a primary winding inductively coupled to a secondary winding across an isolation barrier;
   a controller located on said primary side and configured to direct operation of said bias supply; and
   bias voltage manipulating circuitry located on said primary side and coupled to an input of said controller, said bias voltage manipulating circuitry configured to receive primary data and based thereon alter transitions of a secondary bias output voltage of said secondary winding between defined voltage levels by varying a voltage provided to said controller; wherein said bias voltage manipulating circuitry is configured to vary one of a sensed voltage and a reference voltage, provided to said controller to alter said secondary bias output voltage.

2. The bias supply as recited in claim 1 wherein said primary data is selected from the group consisting of:
   a primary side condition of said bias supply,
   an input signal received by said bias voltage manipulator to be communicated across an isolation barrier of said transformer,
   multiple primary side conditions of said bias supply,
   a primary side temperature,
   a switching frequency of a primary side switch of said transformer,
   a primary input current of said bias supply,
   a primary input voltage of said bias supply,
   input undervoltage, and
   overvoltage shutdown.

3. The bias supply as recited in claim 1 wherein said controller is configured to adjust modulation of a switching device associated with said bias supply to alter said secondary bias output voltage.

4. The bias supply as recited in claim 1 wherein said defined levels are at least two.

5. The bias supply as recited in claim 1 wherein said defined levels are determined at manufacturing.

6. The bias supply as recited in claim 1 wherein said bias supply is a board mounted power module.

7. A bias supply having is primary side and a secondary side, comprising:
   a bias supply transformer having a primary winding inductively coupled to a secondary winding across an isolation barrier;
   a controller located on said primary side and configured to direct operation of said bias supply; and
   bias voltage manipulating circuitry located on said primary side and coupled to an input of said controller, said bias voltage manipulating circuitry configured to receive primary data and based thereon alter transitions of a secondary bias output voltage of said secondary winding between defined voltage levels by varying a voltage provided to said controller, wherein said manipulating circuitry is coupled to an input of said controller that is a feedback input for controlling said voltage.

8. A method of communicating data across an isolation barrier, comprising:
   receiving a signal to transmit across an isolation barrier located between a primary side and a secondary side of a bias supply;
   varying a voltage provided to a controller on said primary side in response to receiving said signal; and
   altering transitions of a secondary bias voltage on said secondary side between defined voltage levels in response to said varying, wherein said transitions between said defined voltage levels associated with said signal; wherein said varying includes changing a sensed voltage provided to said controller.

9. The method as recited in claim 8 wherein said signal represents primary data selected from the group consisting of:
   a primary side condition of said bias supply,
   an input signal received by a bias voltage manipulator of said bias supply to be communicated across an isolation barrier of said bias transformer,
   multiple primary side conditions of said bias transformer,
   a primary side temperature,
   a switching frequency of a primary side switch of said bias transformer,
   a primary input current of said bias transformer,
   a primary input voltage of said bias transformer,
   input undervoltage, and
   overvoltage shutdown.

10. The method as recited in claim 8, wherein said varying includes adjusting modulation of a switch associated with said bias transformer.

11. The method as recited in claim 8 wherein said varying includes changing as reference feedback voltage provided to said controller.

12. The method as recited in claim 8 further comprising differentiating said defined voltage levels to detect receipt of said signal on said secondary side.

13. A power supply, comprising:
   a power transformer;
   a bias supply including:
      a bias supply transformer having a primary winding inductively coupled to a secondary winding via an isolation barrier;
      a bias controller located on a primary side of said bias supply transformer and configured to direct operation of said bias supply transformer; and
      bias voltage manipulating circuitry located on said primary side and configured to receive primary data and based thereon alter transitions of a secondary bias output voltage of said secondary winding between defined voltage levels by varying a voltage provided to said bias controller; and
   a power supply controller on a secondary side of said power transformer and configured to receive said secondary bias voltage and differentiate said transitions between said defined voltage levels to detect receipt of said primary data on said secondary side.

14. The power supply as recited in claim 13 wherein said bias voltage manipulating circuitry is configured to vary a sensed voltage provided to said bias controller to alter said secondary bias output voltage.

15. The power supply as recited in claim 13 wherein said bias voltage manipulating circuitry is configured to vary a reference voltage provided to said bias controller to alter said secondary bias output voltage.

16. The power supply as recited in claim 13 wherein said primary data is selected from the group consisting of:
a primary side condition of said power supply,
an input signal received by said bias voltage manipulator to be communicated across an isolation barrier of said power supply transformer,
multiple primary side conditions of said power supply,
a primary side temperature,
a switching frequency of a primary side switch of said power supply,
a primary input current of said power supply,
a primary input voltage of said power supply,
input undervoltage, and
overvoltage shutdown.

17. The power supply as recited in claim 13 wherein said bias controller is configured to adjust modulation of a switching device associated with said bias supply to alter said secondary bias output voltage.

18. The power supply as recited in claim 13 wherein said bias supply is a board mounted power module.

19. A power supply, comprising:
a power transformer;
a bias supply including:
a bias supply transformer having a primary winding inductively coupled to a secondary winding via an isolation barrier;
a bias controller located on a primary side of said bias supply transformer and configured to direct operation of said bias supply transformer; and
bias voltage manipulating circuitry located on said primary side and configured to receive primary data and based thereon alter transitions of a secondary bias output voltage of said secondary winding between defined voltage levels by varying a voltage provided to said bias controller; and
a power supply controller on a secondary side of said power transformer and configured to receive said secondary bias voltage and differentiate said defined voltage levels to detect receipt of said primary data on said secondary side based on said transitions between said defined voltage levels.

* * * * *

UNITED STATES PATENT AND TRADEMARK OFFICE
CERTIFICATE OF CORRECTION

| | | |
|---|---|---|
| PATENT NO. | : 8,971,074 B2 | Page 1 of 1 |
| APPLICATION NO. | : 13/343216 | |
| DATED | : March 3, 2015 | |
| INVENTOR(S) | : Guthrie et al. | |

It is certified that error appears in the above-identified patent and that said Letters Patent is hereby corrected as shown below:

In the claims

In Column 9, Line 66, in Claim 7, delete "is" and insert -- a --, therefor.

Signed and Sealed this
Third Day of November, 2015

Michelle K. Lee
*Director of the United States Patent and Trademark Office*